United States Patent [19]

Shanbhag et al.

[11] 4,256,772

[45] Mar. 17, 1981

[54] FRUIT AND CEREAL PRODUCTS AND PROCESS THEREFOR

[75] Inventors: Sudhakar P. Shanbhag, Tarrytown; Alina S. Szczesniak, Mt. Vernon, both of N.Y.

[73] Assignee: General Foods Corporation, White Plains, N.Y.

[21] Appl. No.: 83,185

[22] Filed: Oct. 9, 1979

Related U.S. Application Data

[63] Continuation of Ser. No. 11,729, Feb. 12, 1979, abandoned, which is a continuation of Ser. No. 471,419, Jul. 18, 1973, abandoned, which is a continuation of Ser. No. 239,980, Mar. 31, 1972, abandoned.

[51] Int. Cl.$^3$ .................. A23B 7/08; A23L 1/164
[52] U.S. Cl. ..................... 426/331; 426/620
[58] Field of Search ............ 426/102, 103, 281, 302, 426/310, 321, 331, 455, 465, 615, 640

[56] References Cited

U.S. PATENT DOCUMENTS

| | | | |
|---|---|---|---|
| 119,442 | 9/1871 | Achart | 426/270 |
| 1,434,837 | 11/1922 | Newby | 426/379 |
| 1,853,151 | 4/1932 | Segur | 426/302 |
| 1,886,233 | 11/1932 | Sanders | 426/364 |
| 2,005,184 | 6/1935 | Forrest | 426/363 |
| 2,278,469 | 4/1942 | Musher | 426/96 |
| 2,909,435 | 10/1959 | Watters | 426/102 |
| 3,006,773 | 10/1961 | Fitzgerald | 426/346 |
| 3,453,118 | 7/1969 | Jobin | 426/321 |
| 3,595,681 | 7/1971 | Kaplow | 426/324 |
| 4,103,035 | 7/1978 | Fulger et al. | 426/321 |

*Primary Examiner*—Ernest G. Therkorn
*Attorney, Agent, or Firm*—Mitchell E. Alter; Thomas R. Savoie; Bruno P. Struzzi

[57] ABSTRACT

Improved, shelf-stable breakfast foods are prepared consisting of novel, semi-moist fruit and/or fruit pieces blended with cereal of the dry crisp type which is generally served with sugar and cold milk or cream. The relatively high moisture content of the semi-moist, soft fruit is equilibrated with that of the substantially dry crisp cereal particles by equating the water activities of both ingredients before or during storage and thereby effectively controlling moisture migration from the fruit to the cereal over prolonged periods of storage, resulting in cereals which retain their crispness and admixed fruit which retains substantially its original degree of softness and moistness.

7 Claims, No Drawings

FRUIT AND CEREAL PRODUCTS AND PROCESS THEREFOR

This is a continuation of application Ser. No. 011,729, filed Feb. 12, 1979, which is a continuation of application Ser. No. 471,419, filed July 18, 1973, which is a continuation of application Ser. No. 239,980, filed Mar. 31, 1972, all now abandoned.

BACKGROUND OF THE INVENTION

1. Field of the Invention

This invention relates to a method of preparing novel cereal products having non-cereal material as included ingredients and, in particular, is directed to the preparation of fruit products particularly suited for incorporation in dry breakfast cereals. More specifically, the invention pertains to the treatment of fruits for the retention of their desirable semi-moistness and soft texture during storage and use when employed as adjunct ingredients in dry cereals such as wheat, bran and corn flakes, puffed rice and wheat, sugar coated cereal flakes and the like.

2. Description of the Prior Art

The combination of fruit and dry breakfast cereal has significant consumer appeal. The food processing industry, recognizing the wide enjoyment of fresh fruit with dry breakfast cereals has in the past developed products composed of dry cereal combined with dehydrated fruit. Although enjoying some consumer acceptance, manufacturers of breakfast cereals have been aware of the deficiencies inherent in the breakfast products in which a dry cereal is packaged with a dehydrated fruit and have sought methods to improve upon the quality of these products.

Major among the problems encountered with the dehydrated fruits for use as an admix with dry cereal is that of texture and flavor. Generally, in order to have a satisfactory degree of stability it is the usual practice to dehydrate the fruits to a level whereat they are hard and have a tough fibrous structure and texture. The difference in texture between the fresh fruit and its dried counterpart, dehydrated sufficiently to prevent spoilage, is of such magnitude as to make the dried fruit unappetizing and unacceptable to much of the consuming public. Also, the dehydrated fruit does not readily reconstitute to a soft, acceptable texture upon addition of cold milk to the cereal. In most instances by the time the fruit pieces have absorbed sufficient liquid to attain an acceptable texture, the cereal has become unappetizingly soggy.

Freeze-dried fruit pieces, although having the capability of reconstituting quickly with cold milk, are costly to produce and, upon rehydration, yield products which are inferior to their fresh fruit counterparts.

Conversely, if the fruit is only dehydrated to the extent it retains a high degree of moisture in order to have a soft texture, it will either not be bacteriologically stable at room temperature or, when admixed with the dry cereal, will lose moisture to the cereal and thus cause the cereal to become soggy and the fruit to become dry, hard, and excessively tough.

Although shelf stable fruits having moisture levels sufficient to impart softness to the fruit have been prepared in the past, they have been processed for the attainment of bacteriological stability and, what has apparently escaped the prior art and that which forms the gist of the present invention is the discovery that fruit and fruit pieces can be processed to a soft, semi-moist condition by a method which inhibits substantially all moisture migration from the fruit to the cereal when packaged as a mixture and thereby ensures the retention of the desirable textural attributes of both the fruit and the cereal materials—a method which provides for the admixing of the fruit with substantially all types of dry cereals with equivalent satisfactory results. Thus, the present invention, to a significant degree, resolves the aforementioned problems and is manifest in dry, crisp breakfast cereal products in which are admixed semi-moist, soft fruit wherein both the fruit and the cereal retain their individual desirable organoleptic qualities upon storage in conventional packaging over prolonged periods of time.

SUMMARY OF THE INVENTION

Accordingly, the present invention is intended to supply the need for cereal products containing soft, semi-moist, tasteful fruit and/or fruit pieces in which the cereals retain their crispness and the fruit its initial characteristic soft texture and appealing taste quality during extended shelf life.

It is another object of the invention to provide a cereal product containing admixed fruit which rapidly hydrates upon the addition of cold milk or cream at the time of serving.

It is still another object of the invention to provide a cereal product containing admixed fruit in which there is no excessive dehydration of the fruit by the cereal.

It is yet another object of the invention to provide a cereal product containing admixed fruit wherein the cereal is not hydrated by the moisture of the fruit to the extent the cereal loses its crispness.

It is also another object of the invention to provide a cereal product in which the problem of segregation of the admixed fruit is minimized and control of the fruit to cereal ratio contained in individual servings is afforded.

It is yet another object of the invention to provide a cereal product containing fruit admixed therein in which the cereal is not limited to any one particular type of grain or size of particle.

Briefly, the above and additional objects of the invention are accomplished by treating the fruit and/or fruit pieces with a moisture stabilizing solution prior to admixing the fruit with the dry cereal. The invention comprehends the infusion of the fruit with an aqueous solution which imparts to the fruit a desirable degree of moistness and, concomitantly the infused solutes of the moisture stabilizing solution, in conjunction with the natural fruit solids, restrain the fruit moisture from migrating to the dry crisp cereal when the so treated fruit is admixed and packaged with the cereal. The invention is predicated upon the discovery that fruits can be infused with solutes, such as edible polyhydric alcohols, whereby the moisture of the fruit is complexed to the extent it is incapable of imparting an equilibrium vapor pressure which is sufficiently larger in magnitude than that of the dry cereal to cause a net transfer of moisture from fruit to cereal. Accordingly, the lack of excessive moisture transfer forestalls the fruit from becoming hard and the cereal from becoming soggy. The essence of the invention resides in the discovery that the equilibrium vapor pressures of the fruit and the cereal can be equated at values commensurate with widely different moisture levels of fruit and cereal—relatively high moisture levels in the fruit in the range of 18% to 34% which imparts softness and moist mouth-feel and conversely, low moisture levels of about 3 to 8% in the cereal which imparts dryness and crispness. By so equating the vapor pressures of the two components of the breakfast food products, there is no potential or influencing driving force to urge a net transfer of moisture and, accordingly, the fruit is not dehydrated by the cereal when stored over prolonged periods of time as a packaged admix and the cereal is not hydrated by the fruit to the degree of losing its crispness.

The features of the invention which are believed to be novel are set forth with particularity and are distinctly claimed in the concluding portion of the specification, the invention, however, both as to its organization and operation, may best be appreciated by reference to the following detailed description of the preferred embodiments.

DESCRIPTION OF THE PREFERRED EMBODIMENTS

Although the invention has been summarized in terms of equilibrium vapor pressure, a more detailed explanation, especially with respect to a description of the preferred embodiments, can be best set forth by the use of the term "water activity". Water activity is a term now commonly used in the food processing art, particularly with respect to its effect on maintaining bacteriostasis in intermediate moisture foods—i.e., foods having moistures in the range of from about 20% to about 50%. Briefly, water activity is the measure of the ratio of the equilibrium vapor pressure of water above a substance, such as a food, to the vapor pressure of pure water, both taken at the same temperature. It is, therefore, a dimensionless number and to say a cereal at 6% moisture has a water activity of 0.45 at 70° F., in effect, amounts to saying that the water equilibrium vapor pressure above the cereal is but 0.45 the value of that of the water vapor pressure above pure liquid water at the same temperature.

Typically, cereal products such as processed flakes, pieces or extrudates of wheat, bran, corn, oats, etc. are packaged having a moisture content of about 1–4%. Within this moisture range, the cereal is very dry to the touch and is crisp. Depending upon the particular type of cereal, both as to physical form and raw material, there is a moisture content range above which the cereal is no longer considered to have acceptable crispness—this level of moisture is commonly termed the "critical moisture" and Table I below lists the critical moisture range values for some of the more popular cereals. In general, if the moisture content of the cereal exceeds the critical range, the cereal begins to lose its crispness and starts to become soggy.

TABLE I

CRITICAL MOISTURE RANGE OF REPRESENTATIVE DRY CEREALS FOR CRISPNESS RETENTION[1]

| Cereal Type | Critical Moisture Range[2] (% H$_2$O By Wt. Basis) | Corresponding A$_w$[3] |
|---|---|---|
| Flake | | |
| Corn Flakes | 4.5–5.2 | 0.40–0.45 |
| 40% Bran Flakes | 4.6–6.2 | 0.45–0.50 |
| Granular | | |
| Grape Nuts ® | 3.8–4.4 | 0.45–0.50 |
| Extruded | | |
| Alpha Bits ® | 5.2–5.4 | 0.40–0.45 |
| Puffed | | |
| Frosted Rice ® | | |

TABLE I-continued

CRITICAL MOISTURE RANGE OF REPRESENTATIVE DRY CEREALS FOR CRISPNESS RETENTION[1]

| Cereal Type | Critical Moisture Range[2] (% H$_2$O By Wt. Basis) | Corresponding A$_w$[3] |
|---|---|---|
| Krinkles | 3.5–3.7 | 0.40–0.45 |

[1]As determined by trained texture profile panel (Brandt, M. A., Skinner, E. Z., and Coloran, J. A., "Texture Profile Method", J. Food Science 28, 404-9, 1963).
[2]Moisture as determined by the vacuum oven technique: 140° F., 26" Hg. to a constant weight.
[3]A$_w$ values obtained at 70° F. with electric hygrometers, manufactured by Hygrodynamics, Inc., Silver Springs, Md. according to the procedure outlined in Operating Instructions Bulletin N-184,SN994.

Also listed in Table I are the water activity values measured at 70° F. for the cereals at their critical moisture. The low values of water activities reflect the low equilibrium water vapor pressures above the cereals when they are packaged in closed containers. While a moisture proof package prevents the cereals from absorbing moisture from the atmosphere, it is apparent that a material which has a higher equilibrium water vapor pressure when admixed with the cereal in a closed package would be dehydrated by the cereal—that is, the moisture would be avidly absorbed by the cereal from the non-cereal material and equilibrium conditions, with no further net transfer of moisture, would result only after the cereal had absorbed sufficient moisture and the non-cereal material had lost an equivalent amount of moisture to result in both components having equal water activities.

The salient point of the invention is, therefore, the suppression of this moisture transfer by equating the water activity of the fruit with the water activity of the cereal at a value which corresponds to that of the critical moisture of the cereal or below, and the crux of the invention resides in the discovery that this can be accomplished at moisture conditions whereby the fruit is soft and semi-moist.

The preferred embodiments of the invention will be set forth in terms of whole fruit units and fruit pieces, such as those of raisins, currants, dates, figs, apples, bananas, pears, peaches, pineapple, apricots and the like. However, the invention, with relatively minor variations in processing techniques and conditions is applicable to other fruits which can be combined with dry breakfast-type cereal.

Among the fruit units that may be employed, it is convenient to use those which are relatively small in size. However, fruits which are only available in units or segments somewhat inconveniently large can be diced or otherwise cut to a suitable degree to render them more adapted to blending with the cereal.

As aforementioned, in order for the fruit to be soft and tender, it must contain a sufficiently high percentage of moisture. Fruits which are commonly used for blending with cereal are dehydrated to a moisture content ranging from about 2% to about 16% by weight and have a water activity ranging from about 0.15 to about 0.65. When blended and packaged with dry cereal and stored for a few weeks, the high moisture fruits e.g., raisins, are further dehydrated by the cereal and become unduly hard and excessively chewy.

Therefore, when dried fruits are to be processed according to the method of the invention, their moisture content is increased to from about 18% to 34% in order to impart the requisite softness, tenderness and semi-moistness to the fruit and, additionally and most importantly, the fruits are infused with solutes which will stabilize the moisture in such a manner that the treated fruit will have an $A_w$ of 0.40 to 0.65 and will subsequently have an equilibrated water activity of from about 0.45 to about 0.50 i.e., approximately equal to or lower than the water activity corresponding to the critical moisture of the cereal with which it is blended and packaged.

Ideally, the water activity of the moisturized fruit should be equivalent to the water activity of the dry, crisp cereal at the time of blending and packaging. From a practical standpoint, however, it has been determined that a sufficient degree of moisture stabilization will occur soon after packaging and storage provided the difference in the respective water activities does not exceed from about 0.25 to about 0.35 at the time of blending and packaging. Of course, the extent to which the water activities can be different and yet effect sufficient moisture stabilization to yield moistness in the fruit and dryness and crispness in the cereal upon storage will be determined, to a considerable degree, by the relative amounts of each component blended and the extent to which the cereal is dried below its critical moisture at the time of blending and packaging. Therefore, if the cereal is dry at the time of being admixed with the moisturized fruit, the fruit can, at the time of packaging with the cereal, have an $A_w$ as high as about 0.65.

Various edible polyhydric alcohols are of use for stabilizing the moisture content of the fruit. These alcohols are found to be not only effective stabilizing solutes but, importantly, act in simulating product moistness for enhancing eating quality. Glycerol is the preferred solute since, in addition to effectively stabilizing the fruit moisture and imparting added simulated moistness, the intrinsic sweet flavor of glycerol is very compatible with the somewhat similar natural sweetness of the fruit. Other preferred edible polyhydric alcohols are sorbitol, mannitol and mixtures thereof. Additionally, it has been found that sugars such as dextrose and sucrose are effective solutes of use for moisture stabilizing purposes and, for best overall functionality, it has been determined that a combination of glycerol and sucrose at from about a 3:1 to 1:1 respectively, weight ratio in aqueous solution is the most preferred medium for infusing the fruit to attain the requisite physical and sensory attributes and required degree of moisture stabilisation. Dextrose and a combination of dextrose and glycerol are also suitable solutes.

In practicing the invention, the fruit can be infused with a sufficient quantity of moisture stabilizing solution by any of a number of methods. The fruit can be soaked in an excess of the solutions ranging from about 2 to about 7 parts of solution by weight to 1 part of fruit, or, in order to effect more rapid infusion, the fruit can be infused with the solution at elevated temperatures by heating the solution at, or near, the boiling temperature. Other methods of infusing the fruit can also be practiced such as pressure infusion, infusion after subjecting the fruit to reduced pressures and/or combinations of such techniques. The manner in which the fruit is infused is primarily a matter of effectiveness and expediency—the important criteria are those of obtaining the requisite moisture content for imparting softness and tenderness to the fruit and to stabilize the overall moisture content of the fruit to a degree whereby it exhibits a water activity approximating that of the dry cereal water activity below its critical moisture in which they are to be blended. Therefore, such alternatives as starting with a fruit with a moisture much higher than 15% and dehydrating the fruit prior to infusion or, conversely, dehydrating the fruit after the infusion with the stabilizing solutes, are considered within the scope and spirit of the invention.

Subsequent to infusing the fruit with the stabilizing solutes, it may be sugar (sucrose) coated if desired and then blended with the cereal utilizing conventional equipment and techniques.

It has been found desirable to first dust the moisturized fruit with a moisture binder prior to sugar coating the fruit. Dusting agents such as finely ground corn, tapioca or potato starch are appropriate for this purpose and instant TEXTAID, a modified tapioca starch manufactured by the National Starch and Chemical Corp., N.Y., N.Y. is preferred.

In order that the present invention may be more clearly understood, reference will now be had to the following examples which illustrate representative methods of infusing the fruit and describe the resulting fruit and cereal products and their storage stabilities. In the examples which follow and which are intended solely to be illustrative and not exhaustive of the invention, $A_w$ stands for water activity, ml stands for milliliter(s), g stands for grams, and the parts and percentages expressed are by weight.

EXAMPLE I

A 2500 g quantity of Granny Smith apples was washed with cold water, peeled, cored and sliced into wedges. Each wedge was then cut cross-wise into two pieces about ⅛" to about ¼" in thickness. A 1350 g amount of the above apple pieces was soaked in 3000 g of a 2% sodium metabisulfite solution for one hour to minimize browning and the apple pieces were then drained of the solution.

A quantity of 1350 g of glycerol and 750 g of sucrose were added to 625 g of water and brought to a boil to obtain a clear solution. The solution was then cooled to room temperature and 4 g of sodium metabisulfite, 8 g of ascorbic acid, and 0.4 g of imitation apple flavor were added to the cooled solution and uniformly blended therein.

The apple pieces were then immersed in the infusion solution and kept at room temperature for 16 hours. The apple pieces were then drained of solution, spread on trays, and dried in a forced air oven, initially at 120°–130° F. for three hours and then at 100° F. for two hours. Subsequently, the apple pieces were equilibrated at room temperature for 4–6 hours. The infused apple pieces were then transferred to a candy coater and dusted with 15 g of instant TEXTAID (modified tapioca starch) to prevent sticking.

The infused and coated apple piecer had a typical, pleasant apple flavor with no noticeable off-flavors contributed by the additives or the process. When compared with commercially available, dehydrated pieces the infused apple pieces tasted softer, less chewy, and more moist. The moisture content of the infused apple pieces was 21.0% and the $A_w$ was 0.44.

The processed apple pieces were blended with crisp corn flakes at a 1:3 weight ratio respectively, and the mixture was placed in tightly capped glass jars, and stored at room temperature. The blend of apple pieces and crisp cereal was evaluated periodically by a trained flavor and texture profile panel. Even after six months storage, the dry cereal of the mixtures remain crisp and the apple pieces soft and moist.

EXAMPLE II

A 2500 g amount of fresh apricots was washed with cold water, halved, and pitted. Each half of apricot was then cut into two pieces, each piece having a thickness of about ⅛" to ¼". Approximately 1330 g of the above apricot pieces were then soaked in 3000 g of 2% sodium metabisulfite solution for one hour and then drained of the solution.

An infusion solution was prepared as in Example I and the apricots were infused and dried under conditions similar to those described in Example I.

When compared with the commercially available, dehydrated apricots the infused fruit according to the above procedure tasted very soft, moist, and juicy. The infused apricots were more appealing in color and were less shriveled than the dehydrated counterparts. The moisture of the infused apricots was 22.0% and the $A_w$ was 0.47.

The infused apricots were blended with 40% bran flakes and stored at room temperature as in Example I. After six months storage, the bran flakes remained crisp and the infused apricots soft and moist.

EXAMPLE III

A 2500 g quantity of fresh pears was washed with cold water, peeled, halved and each half sliced into eight pieces of about ⅛" to ¼" thickness. The pear pieces (1175 g) were then soaked in 3000 g of 2% sodium metabisulfite solution for one hour in order to minimize browning and were then drained of the solution.

An infusion solution was prepared as in Example I and the pear slices were infused and drained in accordance with the procedure outlined in Example I.

The resulting infused pear pieces had an $A_w$ of 0.44 and a moisture content of 20.0%. The infused product had a typical, pleasant pear flavor with no noticeable off-flavors contributed by the additives or the process.

EXAMPLE IV

Approximately 2500 g of fresh pineapple was washed with cold water, peeled, drained and cut into ¾"×½"×¼" pieces. The pineapple pieces amounted to 1165 g and were soaked in 3000 g of 2% sodium metabisulfite solution and then drained of solution.

An infusion solution was prepared as in Example I. The pineapple pieces were infused according to the process of Example I and were then dried and equilibrated in a forced air oven at 100° F. for six hours.

The infused pineapple pieces tasted very soft, moist, and juicy and had an excellent flavor. The appearance of the infused pineapple pieces was more appealing in color than the fresh pineapple. The infused pineapple pieces had a moisture content of 25.0% and an $A_w$ of 0.57.

EXAMPLE V

An infusion solution was prepared by adding 600 g of sucrose, 150 g of glycerol, 150 g of cerelose, and 3 g of citric acid to 300 g of water. The solution was brought to a boil and then cooled to room temperature. Initiation peach flavor (0.5 g) was then uniformly blended into the solution. Commercial dehydrated peach slices (Del Monte) in an amount of 900 g were added to the above infusion solution and retained at room temperature for 48 hours. The peach slices were then drained of solution, spread on trays, and dried in a forced air oven at 100° F. for sixteen hours. The soft, moist infused fruit was then dusted with 30 g of instant Textaid in order to prevent sticking.

As compared with the starting material, the infused peach slices were softer, less chewy and more moist. They had a less shriveled appearance than the commercial peach slices and, in general, were more eye-appealing. The moisture content of the infused peach slices was 34.0% and the $A_w$ was 0.61.

The above infused peach slices were blended with 40% bran flakes, corn flakes and Rice Krinkles ®. In each case, the blend was one part by weight peach slice and three parts by weight cereal. After being packaged in hermetically sealed containers and stored at room temperature for six months all of the samples of infused fruit blended with cereal were organoleptically acceptable and, in each instance, the fruit retained its soft moist mouth-feel and the cereals retained their crispness.

EXAMPLE VI

A 2000 g quantity of canned Dole pineapple chunks in their own juice was drained and 665 g of the drained chunks was used as the material for infusion.

To 312 g of water was added 675 g of glycerol and 375 g of sucrose and the solution brought to a boil and then cooled to 150° F. A 2 g quantity of sodium metabisulfite and 4 g. of ascorbic acid was then blended into the above infusion solution.

The drained pineapple chunks were added to the infusion solution and kept at 150° F. for three hours. The pineapple chunks were then drained of solution, dried and equilibrated using a procedure similar to that described for apple pieces in Example I. The infused pineapple chunks were then dusted with 3 g of instant Textaid. The final product had an $A_w$ of 0.62 and a moisture content of 22.0%. The organoleptic characteristics of the infused pineapple chunks were similar to those of the product of Example IV.

What is claimed is:

1. A process for preparing a breakfast food having pieces of fruit blended with dry, crisp breakfast cereal particles which comprise the steps of:
   (a) preparing the fruit by
      (1) infusing the fruit with an aqueous solution of edible polyhydric alcohol and a sugar, said polyhydric alcohol selected from the group consisting of glycerol, mannitol, sorbitol, propylene glycol and mixtures thereof and said sugar selected from the group consisting of dextrose, sucrose and combinations thereof,
      (2) drying the infused fruit to a moisture content ranging from about 18% to about 34% by weight, said dry infused fruit having a water activity of from about 0.40 to about 0.65, and then
      (3) dusting the infused fruit with a moisture binder to prevent sticking,
   (b) blending the dusted, infused fruit with dry breakfast cereal particles having a moisture content of about 1 to 4%, and
   (c) packaging the blend of infused fruit and dry breakfast cereal particles whereby the in-package water vapor pressure of the infused fruit pieces and the in-package water vapor pressure of the breakfast cereal particles equate, upon storage, to a value which corresponds to the equilibrium water vapor pressure of the crisp cereal having a moisture content equal to or below its critical moisture.

2. The process according to claim 1 wherein the weight ratio of dry breakfast cereal blended with the infused fruit pieces ranges from about 2:1 to at least 3:1.

3. The process according to claim 1 wherein the fruit pieces are infused with an aqueous solution containing glycerol and sucrose in a weight ratio ranging from about 1:1 to about 3:1.

4. The method of claim 3 wherein the infused fruit is coated with sucrose before blending with the cereal.

5. The method of claim 1 wherein the difference in the water activities of the infused fruit and the cereal does not exceed 0.35 at the time of blending.

6. The method of claim 5 wherein the water activity difference does not exceed 0.25.

7. The method of claim 1 which consists of steps (a) through (c).

* * * * *

UNITED STATES PATENT OFFICE
CERTIFICATE OF CORRECTION

Patent No. 4,256,772　　　　　　　　　Dated　Mar. 17, 1981

Inventor(s)　Shanbhag et al

It is certified that error appears in the above-identified patent and that said Letters Patent are hereby corrected as shown below:

Col. 4 line 13 "N -184.SN994" to read --H-184.SN994--

Signed and Sealed this

Thirtieth Day of March 1982

[SEAL]

Attest:

GERALD J. MOSSINGHOFF

Attesting Officer　　Commissioner of Patents and Trademarks